(12) United States Patent
Lee et al.

(10) Patent No.: US 11,124,082 B2
(45) Date of Patent: Sep. 21, 2021

(54) APPARATUS FOR CONTROLLING ISOLATION CHARGING OF VEHICLE, SYSTEM HAVING THE SAME, AND METHOD THEREOF

(71) Applicants: HYUNDAI MOTOR COMPANY, Seoul (KR); KIA MOTORS CORPORATION, Seoul (KR)

(72) Inventors: Myoung Seok Lee, Seoul (KR); Joo Yong Yeo, Daegu (KR); Mu Shin Kwak, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 237 days.

(21) Appl. No.: 16/413,076

(22) Filed: May 15, 2019

(65) Prior Publication Data
US 2020/0180463 A1 Jun. 11, 2020

(30) Foreign Application Priority Data
Dec. 7, 2018 (KR) .................. 10-2018-0156551

(51) Int. Cl.
*B60L 53/62* (2019.01)
*B60L 53/14* (2019.01)
*H02J 7/00* (2006.01)
*H02M 3/24* (2006.01)

(52) U.S. Cl.
CPC ............. *B60L 53/62* (2019.02); *B60L 53/14* (2019.02); *H02J 7/00* (2013.01); *H02J 2207/20* (2020.01); *H02M 3/24* (2013.01)

(58) Field of Classification Search
CPC . B60L 53/62; B60L 53/14; H02M 3/24; H02J 7/0052
USPC ....................................................... 320/109
See application file for complete search history.

(56) References Cited

U.S. PATENT DOCUMENTS

| | | | |
|---|---|---|---|
| 9,969,277 B2* | 5/2018 | Williams et al. | B60L 3/0069 |
| 10,457,158 B2* | 10/2019 | Namou et al. | B60L 53/14 |
| 10,630,089 B2* | 4/2020 | Zhong et al. | H02J 7/0027 |
| 2012/0091958 A1* | 4/2012 | Ichikawa et al. | B60L 3/0046 320/109 |
| 2014/0232355 A1* | 8/2014 | Masuda et al. | B60L 50/40 320/137 |
| 2016/0039301 A1* | 2/2016 | Igarashi et al. | B60L 53/14 320/157 |
| 2016/0059724 A1* | 3/2016 | Choi | B60L 53/62 320/109 |
| 2018/0354383 A1* | 12/2018 | Namou et al. | B60L 53/124 |
| 2020/0118181 A1* | 4/2020 | Lee et al. | G07F 15/005 |

* cited by examiner

Primary Examiner — Sun J Lin

(57) ABSTRACT

An isolation charging control apparatus of a vehicle includes a first vehicle charging control apparatus receiving a control pilot signal for charging control from a charging station system and to receive power from the charging station system and a second vehicle charging control apparatus isolated from the first vehicle charging control apparatus and performing vehicle charging control, using a signal received from the first vehicle charging control apparatus.

20 Claims, 7 Drawing Sheets

APPARATUS FOR CONTROLLING ISOLATION CHARGING OF VEHICLE, SYSTEM HAVING THE SAME, AND METHOD THEREOF

CROSS-REFERENCE TO RELATED APPLICATION

This application claims the benefit of priority to Korean Patent Application No. 10-2018-0156551, filed in the Korean Intellectual Property Office on Dec. 7, 2018 the entire contents of which are incorporated herein by reference.

TECHNICAL FIELD

The present disclosure relates to an isolation charging control apparatus of a vehicle and a system having the same.

BACKGROUND

The plug-in hybrid vehicle (PHEV) and the electric vehicle (EV) are charged from an external power source, and are driven by the charged power.

As such, a power line, a control pilot (CP) line and a proximity detection (PD) line are connected to a vehicle, for the purpose of charging from the electric vehicle supply equipment (EVSE) of the external charging station.

When charging an electric vehicle, the electric vehicle is connected to the charging equipment in a public charging station.

When overvoltage occurs due to an abnormality in the equipment in the public charging station, the overvoltage can be transmitted to the electric vehicle and can damage electric devices in the vehicle.

SUMMARY

An aspect of the present disclosure provides an isolation charging control apparatus of a vehicle that can prevent an in-vehicle device from being damaged by implementing a charging control apparatus of a vehicle in the isolated manner to prevent overvoltage from being transmitted to the in-vehicle device when the overvoltage is applied, and a system having the same.

According to an aspect of the present disclosure, an isolation charging control apparatus of a vehicle may include a first vehicle charging control apparatus receiving a control pilot signal for charging control from a charging station system and to receive power from the charging station system and a second vehicle charging control apparatus isolated from the first vehicle charging control apparatus and performing vehicle charging control, using a signal received from the first vehicle charging control apparatus.

In an embodiment, the first vehicle charging control apparatus may include a control pilot signal duty ratio sensor changing a state of the control pilot signal and to sense a duty ratio of the control pilot signal and a control pilot signal level detector detecting a voltage level of the control pilot signal.

In an embodiment, the control pilot signal duty ratio sensor may include a first isolation element operated by the control pilot signal and transmitting the duty ratio of the control pilot signal to the second vehicle charging control apparatus.

In an embodiment, the isolation element may include a photodiode operating as a light emitting device.

In an embodiment, the control pilot signal duty ratio sensor may further include a first state conversion device converting the voltage level of the control pilot signal, which is turned on when an inlet of the vehicle is connected to a charging connector, from a first level to a second level lower than the first level and a second state conversion device converting the voltage level of the control pilot signal from the second level to a third level lower than the second level, when a switch for starting charging is turned on.

In an embodiment, the second state conversion device may include a second isolation element receiving a turn-on signal from the second vehicle charging control apparatus and to be turned on, when the switch for starting charging is turned on.

In an embodiment, the control pilot signal duty ratio sensor may include a first resistance element and a second resistance element connected in series between a power supply terminal and a ground terminal and a comparator. The comparator is configured to receive the control pilot signal, the voltage level of which is converted by the second state conversion device, and a voltage of a common node of the first resistance element and the second resistance element, to compare the voltage level of the control pilot signal with the voltage of the common node, and to amplify the comparison result.

In an embodiment, a resistor value of each of the first resistance element and the second resistance element may be configured such that a voltage level of the common node of the first resistance element and the second resistance element, which is applied to the comparator, becomes a value less than a minimum value of the voltage level of the control pilot signal.

In an embodiment, the control pilot signal level detector may include a buffer receiving the control pilot signal applied from the charging station system and to buffer the control pilot signal, a peak detector detecting a peak current of the control pilot signal output from the buffer, a voltage controlled oscillator outputting a frequency signal in proportion to the peak current and an isolation element transmitting the frequency signal to the second vehicle charging control apparatus in an isolated manner.

In an embodiment, the apparatus may further include a proximity detection signal detector detecting a proximity detection signal capable of detecting whether a charging connector is plugged into a vehicle inlet.

In an embodiment, the proximity detection signal detector may be configured to distinguishably detect a state where the charging connector is not plugged into the vehicle inlet, a case where the charging connector is plugged into the vehicle inlet but a switch for charging in the charging connector is turned off, or a case where the charging connector is plugged into the vehicle inlet and the switch for charging in the charging connector is turned on, using a proximity detection signal applied from the charging connector.

In an embodiment, the proximity detection signal detector may include a first comparator driven by receiving a first voltage by the proximity detection signal, and a second voltage obtained by dividing a power supply voltage and a ground voltage by a resistance element, a first isolation element driven by an output of the first comparator and transmitting a signal to the second vehicle charging control apparatus, a second comparator driven by receiving the first voltage by the proximity detection signal, and a second voltage from dividing the power supply voltage and the ground voltage by the resistance element, and a second isolation element driven by an output of the second comparator and transmitting a signal to the second vehicle charging control apparatus.

In an embodiment, both the first isolation element and the second isolation element may be turned off, when the charging connector is not plugged into the vehicle inlet. The first isolation element may be turned on and the second isolation element may be turned off when the charging connector is plugged into the vehicle inlet but a switch for charging in the charging connector is turned off, and both the first isolation element and the second isolation element may be turned on when the charging connector is plugged into the vehicle inlet and the switch for charging in the charging connector is turned on.

In an embodiment, the second vehicle charging control apparatus may include an isolation receiver including at least one or more isolation elements receiving a duty ratio of the control pilot signal, a frequency signal of the control pilot signal, a proximity detection signal from an isolation element of the first vehicle charging control apparatus in an isolated state.

In an embodiment, the second vehicle charging control apparatus may further include an isolation converter supplying power to the first vehicle charging control apparatus in an isolated state.

In an embodiment, the second vehicle charging control apparatus may include a charging start device including an isolation element driven depending on an on/off state of a switch for starting charging and transmitting a charging start signal to the first vehicle charging control apparatus.

According to an aspect of the present disclosure, a system may include a charging connector to which a vehicle inlet is connected for charging, a first vehicle charging control apparatus receiving a control pilot signal for charging control from a charging station system and to receive power, and a second vehicle charging control apparatus isolated from the first vehicle charging control apparatus and performing vehicle charging control, using a signal received from the first vehicle charging control apparatus.

In an embodiment, the charging connector may include a first resistance element and a switch connected in series between a power supply terminal and a ground terminal, a second resistance element and a third resistance element connected in series between the first vehicle charging control apparatus and the ground terminal, and a diode provided between a common node of the first resistance element and the switch and a common node of the second resistance element and the third resistance element.

In an embodiment, the first vehicle charging control apparatus may include a control pilot signal duty ratio sensor converting a state of the control pilot signal and to sense a duty ratio of the control pilot signal, a control pilot signal level detector detecting a voltage level of the control pilot signal, and a proximity detection signal detector detecting a proximity detection signal capable of detecting whether the charging connector is plugged into the vehicle inlet.

In an embodiment, the second vehicle charging control apparatus may include a controller including at least one or more isolation elements receiving a duty ratio of the control pilot signal, a frequency signal of the control pilot signal, a proximity detection signal from an isolation element of the first vehicle charging control apparatus in an isolated state and an isolation converter supplying power to the first vehicle charging control apparatus in an isolated state.

BRIEF DESCRIPTION OF THE DRAWINGS

The above and other aspects, features and advantages of the present disclosure will be more apparent from the following detailed description taken in conjunction with the accompanying drawings.

DETAILED DESCRIPTION

Figure 1:
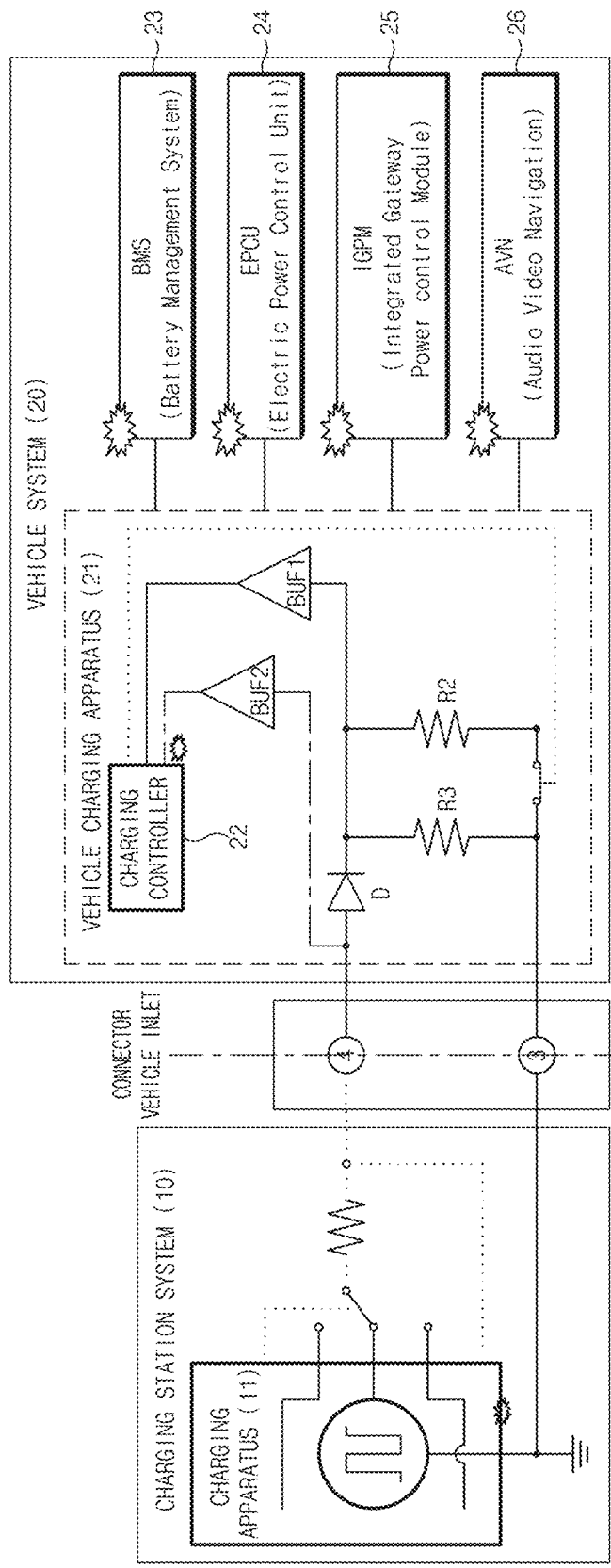
FIG. 1 is a view for describing an example of a vehicle charging device.

Hereinafter, embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

Referring to FIG. 1, in an implementation of an electric vehicle, when overvoltage occurs due to an abnormality in the equipment in a public charging station, the overvoltage can be transmitted to an in-vehicle device through a power line, a CP line, and a PD line. For example, the overvoltage may be applied to not only a vehicle charging device 21 but also a Battery Management System (BMS) 23, an Electric Power Control Unit (EPCU) 24, an Integrated Gateway Power control Module (IGPM) 25, an Audio Video Navigation (AVN) 26, or the like, which is the in-vehicle device, and thus the devices of the vehicle may be damaged.

When a connector is plugged to charge the vehicle charging device 21 at the charging station with the overvoltage problem, not only the vehicle charging device 21 but also the other in-vehicle devices 23, 24, 25, and 26 may be damaged and need to be replaced, thereby increasing the replacement cost.

The present disclosure discloses a configuration that inhibits overcurrent from being applied to the vehicle system by performing charging through isolation communication between a charging station system and a vehicle system even though overcurrent is applied from a charging station system in a state where a vehicle inlet is connected to a charging station system for charging, thereby minimizing the damage of the in-vehicle part.

Below, various embodiments of the present disclosure will be described in detail with reference to FIGS. 2 to 7.

Figure 2:
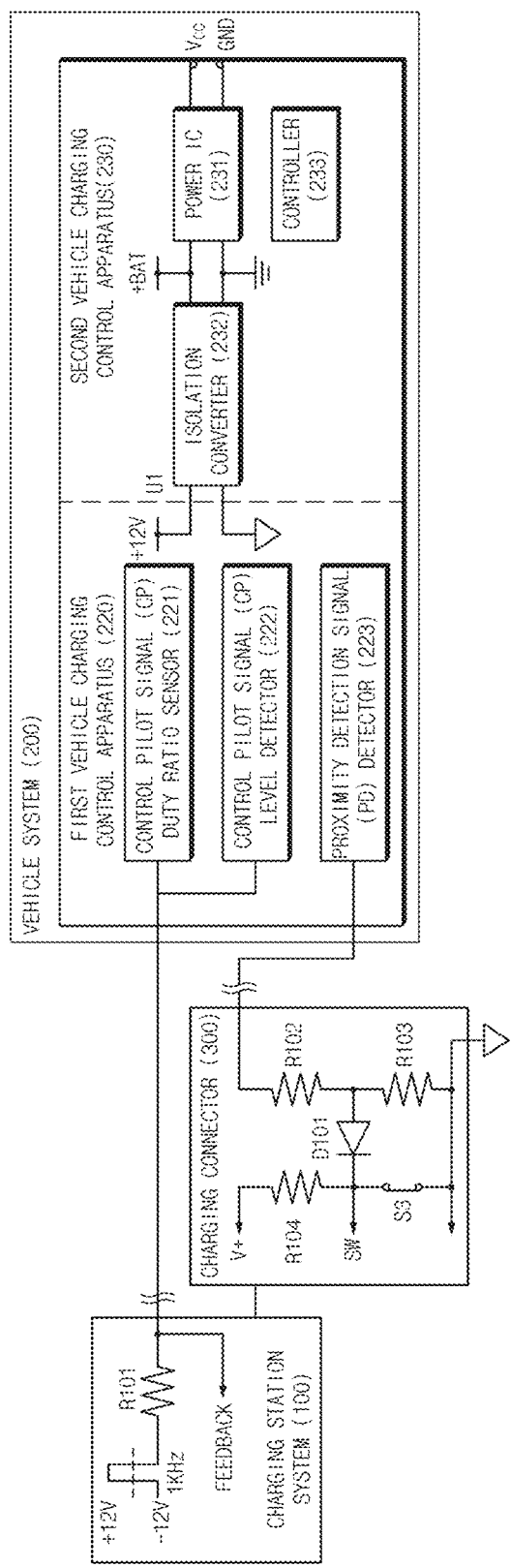
FIG. 2 is a block diagram illustrating a configuration of a vehicle system including a vehicle charging control apparatus, according to an embodiment of the present disclosure.

FIG. 2 is a block diagram illustrating a configuration of a vehicle system including a vehicle charging control apparatus, according to an embodiment of the present disclosure.

Referring to FIG. 2, a system according to an embodiment of the present disclosure may perform charging by allowing a charging station system 100 to provide a vehicle system 200 with electrical energy while the charging station system 100 and the vehicle system 200 are connected through a charging connector 300.

The charging station system 100 refers to a system performing charging by supplying electrical energy to a vehicle connected through the charging connector 300; the charging station system 100 may include a resistor R101 and may supply the voltage of −12 V to 12 V.

The vehicle system 200 according to an embodiment of the present disclosure includes a first vehicle charging control apparatus 220 and a second vehicle charging control apparatus 230. At this time, the vehicle system 200 may be mounted in an electric vehicle requiring charging.

The charging connector 300 is a configuration for connecting the vehicle system 200 to the charging station system 100; the charging is performed only when the charging connector 300 is correctly plugged into the vehicle inlet.

The charging connector 300 includes resistors R102, R103, and R104, a diode D101, and a switch S3. In embodiments, the resistor R104 and the switch S3 are connected in series; one end of the resistor R104 is connected to a power supply terminal V+; the other end thereof is connected to one end of the switch S3; the other end of the switch S3 is connected to a ground terminal GND. In the meantime, the resistor R102 and the resistor R103 are connected in series; one end of the resistor R102 is connected to a proximity detection signal detector 223; the other end of the resistor R102 is connected to one end of the resistor R103; the other end of the resistor R103 is connected to the ground terminal GND. The diode D101 is connected between the common node of the resistor R104 and the switch S3 and the common node of the resistor R102 and the resistor R103; the diode D101 may be provided in a direction from the common node of the resistor R102 and the resistor R103 to the common node of the resistor R104 and the switch S3.

The first vehicle charging control apparatus 220 and the second vehicle charging control apparatus 230 may control vehicle charging; the first vehicle charging control apparatus 220 and the second vehicle charging control apparatus 230 may perform communication for charging while being electrically isolated from each other.

The first vehicle charging control apparatus 220 includes a control pilot signal (CP) duty ratio sensor 221, a control pilot signal (CP) level detector 222, and the proximity detection signal (PD) detector 223. In embodiments, the control pilot signal CP refers to a signal for exchanging information of a vehicle between the charging station system 100 and the vehicle system 200. The proximity detection signal PD detects whether the connector of the charging station system 100 is correctly plugged into the inlet of a vehicle.

The control pilot signal (CP) duty ratio sensor 221 changes the state of the control pilot signal and provides the second vehicle charging control apparatus 230 with the duty of the pilot signal.

The control pilot signal (CP) level detector 222 detects the voltage level of the control pilot signal.

The control pilot signal CP may have the PWM format of 1 kHz; the control pilot signal CP may be transmitted from the charging station system 100 to the vehicle system 200; as illustrated in Table 1 below, the control pilot signal CP may be divided into five states depending on the states of the charging station system 100 and the vehicle system 200 and may be transmitted while the state of the control pilot signal is changed.

TABLE 1

| State of CP signal | Output voltage (V) of charging station system | Vehicle voltage (V) | Description |
|---|---|---|---|
| State A | 12.0 | 0 | A state where a connector is not plugged |
| State B1 | 9.0 | 9.0 | A vehicle inlet is connected to the connector but is not ready to receive energy. A state where the energy of EVSE is not ready to be supplied. |
| State B2 | 9.0 | 9.0 | A vehicle inlet is connected to the connector but is not ready to receive energy. A state where EVSE is ready to supply the energy. |
| State C | 6.0 | 6.0 | A vehicle inlet is connected to the connector and is ready to receive energy. |
| State E | 0 | 0 | A charging station connector is separated from the vehicle inlet and commercial power loss or CP circuit short |
| state F | −12.0 | −12.0 | Other problems occur at the charging station system |

State A is the case that the charging station system 100 and the vehicle system 200 are not connected to each other; the charging station system 100 outputs a DC signal of 12 V and the vehicle system 200 receives "0" V because the vehicle is not connected to the charging station system 100. When a connector is plugged into a vehicle inlet, the control pilot signal may be in state B, the charging station system 100 outputs a signal of 1 kHz (+9 V), and the vehicle system 200 detects the signal. When the vehicle system 200 is ready to be charged, the vehicle system 200 may change the state of the control pilot signal to state C by turning on the switch S2 (illustrated in FIG. 6 below) and the vehicle system 200 receives a PWM signal of +6 V.

The proximity detection signal (PD) detector 223 may determine whether the connector is plugged into a vehicle inlet, through a proximity detection signal. In embodiments, the proximity detection signal detector 223 may detect items to be described below, through the proximity detection signal.

TABLE 2

| Description |
|---|
| When the charging station connector is not plugged. |
| When the charging station connector is connected, and |

TABLE 2-continued

| Description |
| --- |
| when switch S3 is released. |
| When the charging station connector is connected, and when switch S3 is pressed. |

The second vehicle charging control apparatus 230 may be in a state where the second vehicle charging control apparatus 230 is isolated from the first vehicle charging control apparatus 220; the second vehicle charging control apparatus 230 may obtain control pilot signal duty information, control pilot signal voltage level information, and proximity detection signal information from the first vehicle charging control apparatus 220. To this end, the second vehicle charging control apparatus 230 includes a power IC 231, an isolation converter 232, and a controller 233.

The power IC 231 supplies a power supply voltage. The isolation converter 232 provides the first vehicle charging control apparatus 220 with the power supply voltage received from the power IC 231. In embodiments, the isolation converter 232 may supply power in a state isolated from the first vehicle charging control apparatus 220. For example, the isolation converter 232 includes an isolation transformer; the isolation transformer is a transformer in which the AC power receiving side (primary side) and the power supply side (secondary side) are electrically isolated from each other; the isolation transformer is used to exchange to the non-ground type transmission line and to reduce noise; the isolation transformer may prevent mutual interference between power sources through the isolation between the primary side and the secondary side, and may block the noise or impulsive abnormal voltage of the primary side.

The controller 233 may turn on and off the switch S2 for starting charging and may obtain the control pilot signal duty information, the control pilot signal voltage level information, and the proximity detection signal information from the first vehicle charging control apparatus 220.

As such, the charging station system 100 transmits a control pilot signal and a proximity detection signal to the first vehicle charging control apparatus 220; the first vehicle charging control apparatus 220 performs signal conversion and isolation processing to provide the second vehicle charging control apparatus 230 with the performed result. In embodiments, the ground terminal of the first vehicle charging control apparatus 220 is connected to the charging station system 100; the ground terminal of the second vehicle charging control apparatus 230 is connected to a vehicle chassis; the ground terminal of the first vehicle charging control apparatus 220 and the ground terminal of the second vehicle charging control apparatus 230 may be formed to be isolated. Furthermore, the second vehicle charging control apparatus 230 may supply the battery power of 12 V to the first vehicle charging control apparatus 220 through an isolated DC-DC converter such as a flyback converter.

The overvoltage is not transmitted to the entire parts inside the vehicle, but only to the first vehicle charging control apparatus 220, when overvoltage is applied because a fault occurs in the charging station system 100 and the first vehicle charging control apparatus 220; the breakage of the second vehicle charging control apparatus 230 may be prevented or avoided even though the first vehicle charging control apparatus 220 is broken; as a result, it is possible to repair the fault by replacing only the first vehicle charging control apparatus 220, thereby reducing the cost.

Figure 3:
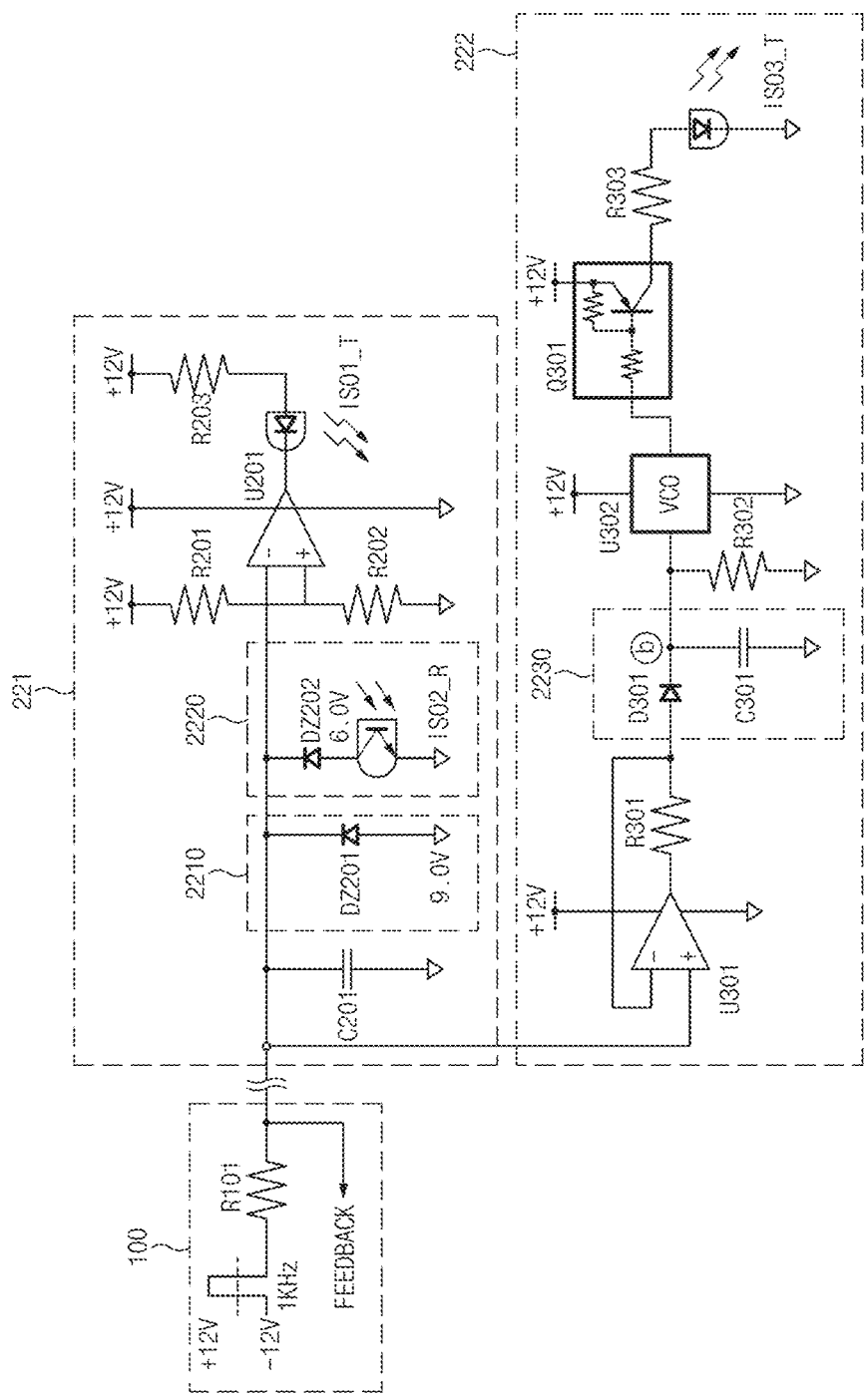
FIG. 3 is a detailed circuit diagram of a control pilot signal duty ratio sensor and a control pilot signal level detector of FIG. 2.

FIG. 3 is a detailed circuit diagram of the control pilot signal duty ratio sensor 221 and the control pilot signal level detector 222 of FIG. 2.

Referring to FIG. 3, the control pilot signal duty ratio sensor 221 includes a capacitor C201, a first state conversion device 2210, a second state conversion device 2220, resistors R201 and R202, a comparator U201, a photodiode IS01_T, and a resistor R203.

The capacitor C201 receives a control pilot signal CP applied by the charging station system 100, and then is charged. In embodiments, the control pilot signal is output as a DC signal of 12 V (a first state, state A); the level of the control pilot signal is dropped by the resistor R101, and then the control pilot signal is applied to the capacitor C201.

The first state conversion device 2210 includes a zener diode DZ201; when a vehicle inlet is connected to a connector, the zener diode DZ201 is turned on and is connected to a ground terminal; the control pilot signal of 12 V is dropped and varies between 0 V and 9 V, and the state of the control pilot signal enters state B1 (a second state).

The second state conversion device 2220 includes a phototransistor IS02_R and a zener diode DZ202. When a photodiode IS02_T of the second vehicle charging control apparatus 230 (see FIG. 6) is turned on to start charging, the phototransistor IS02_R is turned on, and the zener diode DZ202 operates and is connected to the ground terminal, and the control pilot signal varies between 0 V and 6 V and enters state C (a third state). In embodiments, the photodiode IS02_T is a light emitting device and the phototransistor IS02_R is a light receiving device; when the light emits by electric energy and light energy is output by the photodiode IS02_T, the phototransistor IS02_R, which is electrically isolated from the photodiode IS02_T, receives the light energy and is turned on. In embodiments, each of the first vehicle charging control apparatus 220 and the second vehicle charging control apparatus 230 may include a pair of a photodiode being the light emitting device and a phototransistor being the light receiving device, which are electrically isolated, and may be able to transmit energy in the isolated state. As such, even though overvoltage is applied to the first vehicle charging control apparatus 220, the overvoltage is not transmitted to the second vehicle charging control apparatus 230 because the second vehicle charging control apparatus 230 is isolated, thereby preventing the damage due to the overvoltage.

The resistors R201 and R202 are connected to each other in series between a power supply terminal and a ground terminal and then the voltage of the common node is applied to terminal (+) of the comparator U201.

As described in Equation 1, terminal (+) of the comparator U201 may set the values of the resistors R201 and R202 so as to be less than the minimum value of the voltage level of the control pilot signal.

$$(+12\ V)\left(\frac{R202}{R201+R202}\right) < CP(min) \quad \text{[Equation 1]}$$

The comparator U201 transmits the duty ratio of the control pilot signal to the phototransistor IS02_R of the second vehicle charging control apparatus 230 through the photodiode IS01_T regardless of the voltage level of the control pilot signal. At this time, the photodiode IS01_T is a light emitting device and the phototransistor IS01_R (see FIG. 6) is a light receiving device; when the light emits by electric energy and light energy is output in the photodiode IS01_T, the phototransistor IS01_R, which is electrically isolated from the photodiode IS01_T, receives the light energy and is turned on. The resistor R203 is provided between the power supply terminal and the photodiode IS0_T.

The control pilot signal level detector 222 provides the second vehicle charging control apparatus 230 with the voltage level of the control pilot signal in an isolation state.

To this end, the control pilot signal level detector 222 includes a buffer U301, a resistor R301, a peak detector 2230, a resistor R302, a Voltage Controlled Oscillator (VCO) U302, a current amplifier Q301, a resistor R303, and a photodiode IS03_T.

The buffer U301 may buffer the control pilot signal such that the peak detector of the next stage operates stably.

The resistor R301 is provided between the buffer U301 and the diode D301. When a PWM pulse is applied in a state where the capacitor C301 is fully discharged, the resistor R301 may prevent or inhibit excessive charging current from flowing into the buffer U301.

The peak detector 2230 includes the diode D301 and the capacitor C301 for the purpose of detecting the peak value of the voltage applied from the output terminal of the resistor R301.

The diode D301 stores the maximum voltage (peak voltage) of the voltage level output from the buffer U301 and the resistor R301, in the capacitor C301. The diode D301 may prevent the voltage stored in the capacitor C301 from being discharging, when the PWM pulse from the buffer U301 disappears.

The resistor R302 is provided between node ⓑ and the ground terminal. The resistor R302 may form a path in which the current flows from the capacitor C301, when the level of the PWM pulse voltage is lowered; the value of the resistor R302 may be set to a value great enough not to affect the detected peak voltage. The capacitor C301 and the resistor R302 may be set by the following Equation 2. The meaning of Equation 2 is to set 'τ' such that the voltage falls from $V_0$ to $V(t)$ during time 't'. As the drop of the voltage falling from $V_0$ to $V(t)$ is less, ripple may be less and the peak may be maintained well.

$$\frac{V(t)}{V_o} = e^{-\frac{t}{\tau}} \quad \text{[Equation 2]}$$

$$\tau = C302 \cdot R302$$

The VCO U302 refers to a VCO; and the VCO U302 outputs a frequency signal PWM in proportion to the peak voltage based on the peak voltage detected by the peak detector 2230.

The current amplifier Q301 amplifies the current output by the VCO U302, to drive the photodiode IS03_T.

The resistor R303 is provided between the current amplifier Q301 and the photodiode IS03_T. The photodiode IS03_T is a light emitting device; the photodiode IS03_T provides the phototransistor IS03_R of the second vehicle charging control apparatus 230 with the voltage CP_VMD of a PWM pulse of the pilot signal in the form of a frequency.

Figure 4:
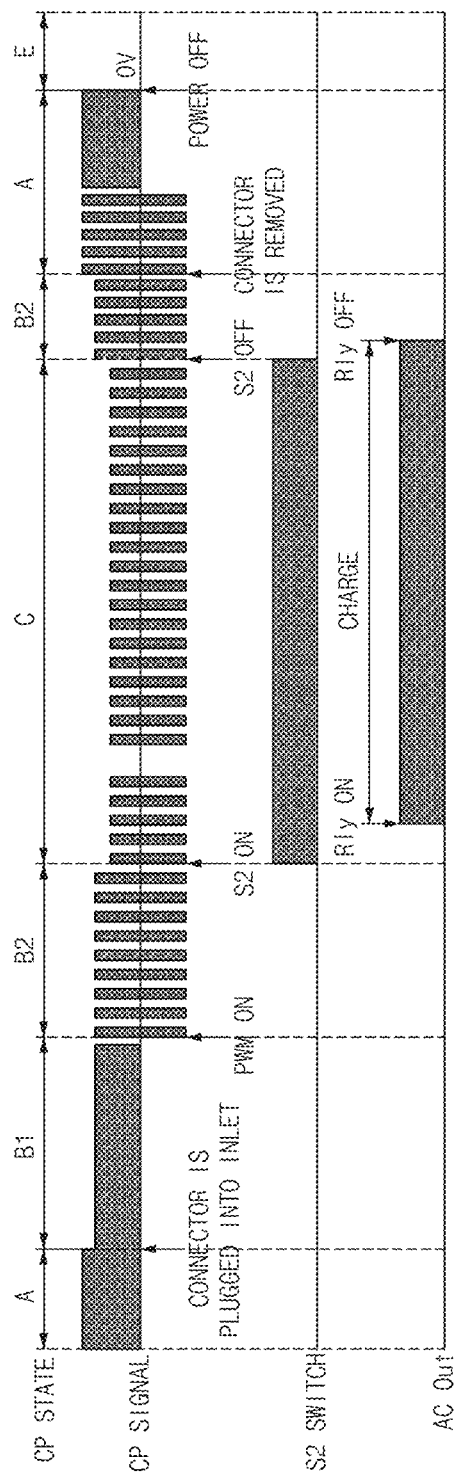
FIG. 4 is a timing diagram for describing a state change of a control pilot signal, according to an embodiment of the present disclosure.

Hereinafter, a describing of a state change of a control pilot signal of an vehicle will be described with reference to Table 1 and FIG. 4. Table 1 is a table indicating the state of a control pilot (CP) according to a state where a connector is plugged. FIG. 4 is a timing diagram for describing a state change of a control pilot signal, according to an embodiment of the present disclosure.

Referring to FIG. 4, the second vehicle charging control apparatus 230 starts charging by turning on the switch S2, when a PWM signal is applied as the control pilot signal.

While the control pilot signal CP maintains the DC voltage of 12 V in a section (state A, the first state) where a connector is not plugged into an inlet, the control pilot signal CP maintains the DC voltage of 9 V in section B1 (the second state) where the connector is plugged into a vehicle inlet and then maintains PWM of 9 V in section B2.

Afterward, when the charging preparation is completed, the first vehicle charging control apparatus 220 starts charging by operating the control pilot signal between 0 V and 6 V; when charging is completed, the phototransistor IS02_T is turned off and the level of the control pilot signal is between 0 V and 9 V.

Afterward, when the connector is removed from the vehicle inlet (state A), the control pilot signal is in +12 V/−12 V level.

Figure 5:
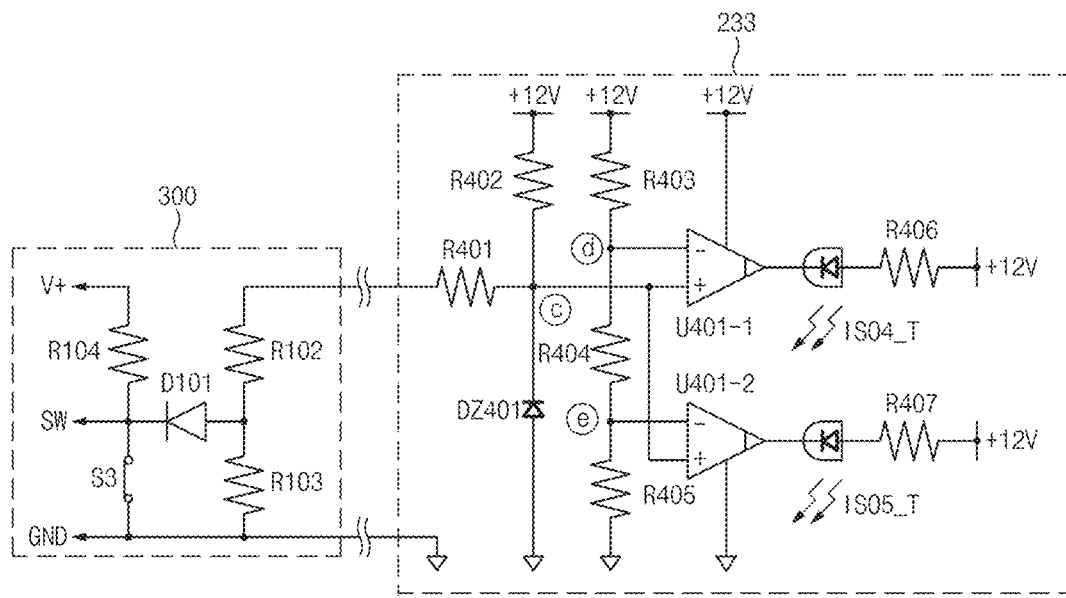
FIG. 5 is a detailed circuit diagram of a proximity detection signal detector of FIG. 2.

FIG. 5 is a detailed circuit diagram of the proximity detection signal detector 223 of FIG. 2.

Referring to FIG. 5, as illustrated in Table 3, the proximity detection signal detector 223 may detect at least one state of charging connector disconnection, switch S3 ON and connector connection, or switch S3 off and connector connection, through a proximity detection signal.

TABLE 3

| State | Voltage [V] | Separation voltage | Location |
|---|---|---|---|
| No connection | 12 V | | ⓒ |
| | | About 10 V | ⓓ |
| Connection, switch S3 is turned off | 7.648 V | | ⓔ |
| | | About 6.5 V | ⓔ |
| Connection, switch S3 is turned on | 5.514 V | | ⓔ |

The proximity detection signal detector 223 includes resistors R401 and R402, a zener diode DZ401, resistors R403, R404, and R405, comparators U401-1 and U401-2, photodiodes IS04_T and IS05_T, and resistors R406 and R407. The resistor R401 is connected to one end of the resistor R102 of the vehicle connector 210; the resistor R402 and the zener diode DZ401 are connected to each other in series between a power supply terminal and a ground terminal and the common node ⓒ thereof is connected to the output terminal of the resistor R401. At this time, the voltage of the common node ⓒ is input to terminal (+) of the comparators U401-1 and U401-2.

The resistors R403, R404, and R405 are connected in series between the power supply terminal and the ground terminal; the voltage of the common node ⓓ of the resistors R403 and R404 is input to input terminal (−) of the comparator U401-1. The voltage of the common node ⓔ of the resistors R404 and R405 is input to input terminal (−) of the comparator U401-2.

The photodiodes IS04_T and IS05_T are provided to output terminals of the comparators U401-1 and U401-2, respectively; the resistor R406 is provided between the power supply terminal and the photodiode IS04_T; the resistor R407 is provided between the power supply terminal and the photodiode IS05_T.

1) When a connector is not connected, the voltage at common node ⓒ rises to the highest level; because the voltage at common node ⓒ is higher than the voltage at node ⓓ and ⓔ and the comparators U401-1 and U401-2 are in a float state (High), both the photodiodes ISO4_T and IS05_T are turned off.

In the meantime, 2) when the vehicle connector is connected but the switch S3 is in an off state, the voltage at node ⓒ is set to be lower than the voltage at node ⓓ and higher than the voltage at node ⓔ due to the series connection of the resistors R102 and R103. Accordingly, the output of the comparator U401-1 in which (−) voltage is higher, is in a low level, and the photodiode ISO4_T is turned on; but the photodiode IS05_T still remains in an off state.

3) When the vehicle connector is connected and the switch S3 is turned on, the voltage at node ⓒ is generated by the resistor R102 and the zener diode D101; because the voltage at node ⓒ is lower than the voltage at node ⓓ and ⓔ, the photodiodes ISO4_T and IS05_T are turned on.

Figure 6:
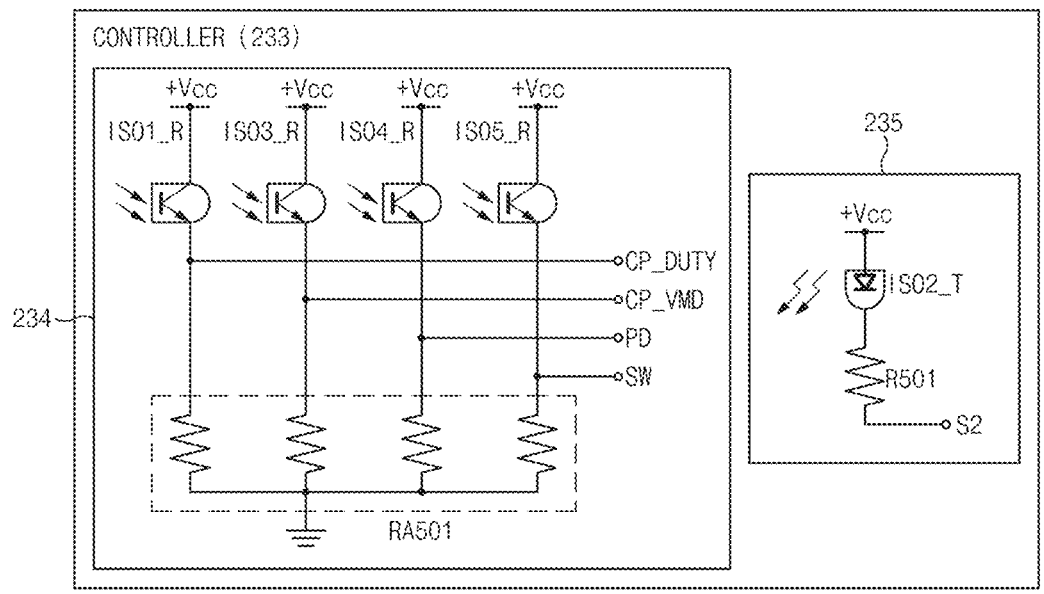
FIG. 6 is a detailed circuit diagram of a controller of a second vehicle charging control apparatus of FIG. 2.

FIG. 6 is a detailed circuit diagram of the controller 233 of the second vehicle charging control apparatus of FIG. 2.

Referring to FIG. 6, the controller 233 includes an isolation receiver 234 and a charging start device 235.

The isolation receiver 234 includes phototransistors IS01_R, IS03_R, IS04_R, and IS05_R, which are light receiving devices, and a resistor device RA501.

The phototransistors IS01_R, IS03_R, IS04_R, and IS05_R that are light receiving devices may receive light energy by the photodiodes IS01_T, IS03_T, IS04_T, and IS05_T being the light emitting device included in the first vehicle charging control apparatus 220 and may convert the light energy to electrical energy. In embodiments, the phototransistor IS01_R may obtain a control pilot duty CP_DUTY; the phototransistor IS03_R may obtain a control pilot level CP_VMD; the phototransistors IS04_R and IS05_R may obtain state information of the proximity detection signal.

The charging start device 235 includes the photodiode IS02T and a resistor R501, which are connected in series between the power supply terminal and the switch S2. The photodiode IS02_T is turned on and then the phototransistor IS02_R included in the first vehicle charging control apparatus 220 is turned on, when the switch S2 is turned on to start charging. As such, the level of the control pilot signal operates at 6 V.

Figure 7:
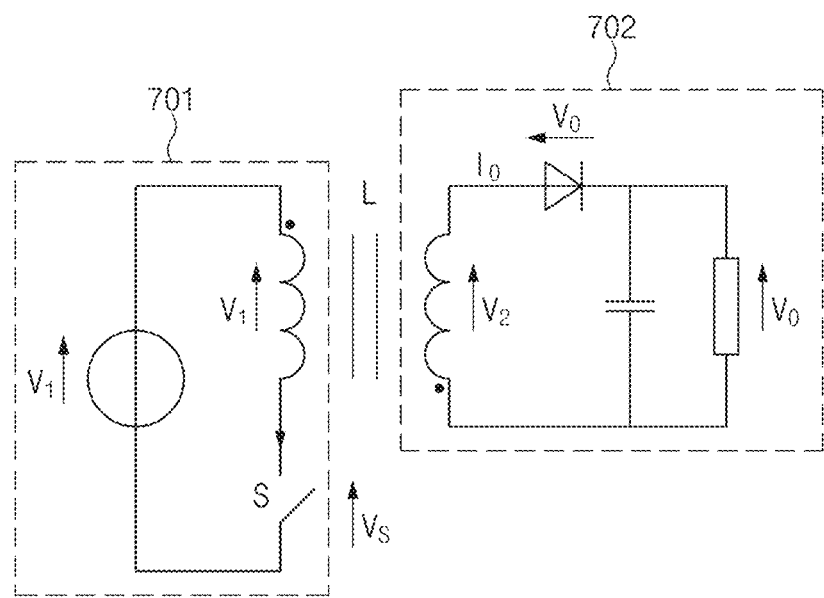
FIG. 7 is a detailed circuit diagram of an isolation converter of FIG. 2.

FIG. 7 is a detailed circuit diagram of the isolation converter 232 of FIG. 2.

The isolation converter 232 provides the first vehicle charging control apparatus 220 with the power supplied by the second vehicle charging control apparatus 230 in an isolation state. To this end, the isolation converter 232 may use a DC-DC converter such as a flyback converter.

Referring to FIG. 7, a primary side 701 and a secondary side 702 are isolated through a transformer located in the middle; the primary side 701 to which Vi is applied may operates as the second vehicle charging control apparatus 230 supplying power, and the secondary side 702 to which Vo is applied may operates as the first vehicle charging control device 220. An embodiment is shown in FIG. 7 as an isolation converter is implemented with a flyback converter.

However, an embodiment is not limited thereto. For example, the isolation converter may be implemented with a forward converter, a push-pull converter, an SEPIC converter, a half bridge converter, a full bridge converter, or the like.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

The technology may prevent or inhibit an in-vehicle device from being damaged by preventing or inhibit overvoltage from being transmitted to the in-vehicle device when the overvoltage is applied, thereby minimizing unnecessary cost.

Besides, a variety of effects directly or indirectly understood through this disclosure may be provided.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An isolation charging controller control apparatus of a vehicle, the isolation charging controller apparatus comprising:
   a first vehicle charging controller apparatus configured to receive a control pilot signal for charging control from a charging station system and to receive power from the charging station system; and
   a second vehicle charging controller apparatus isolated from the first vehicle charging controller apparatus and configured to perform vehicle charging control, using a signal received from the first vehicle charging controller apparatus.

2. The isolation charging controller apparatus of claim 1, wherein the first vehicle charging controller apparatus includes:
   a control pilot signal duty ratio sensor configured to change a state of the control pilot signal and to sense a duty ratio of the control pilot signal; and
   a control pilot signal level detector configured to detect a voltage level of the control pilot signal.

3. The isolation charging controller apparatus of claim 2, wherein the control pilot signal duty ratio sensor includes:
   a first isolator element operated by the control pilot signal and configured to transmit the duty ratio of the control pilot signal to the second vehicle charging controller apparatus.

4. The isolation charging controller apparatus of claim 3, wherein the first isolator element includes a photodiode operating as a light emitting device.

5. The isolation charging controller apparatus of claim 2, wherein the control pilot signal duty ratio sensor further includes:
   a first state converter device configured to convert the voltage level of the control pilot signal, which is turned on when an inlet of the vehicle is connected to a charging connector, from a first level to a second level lower than the first level; and
   a second state converter device configured to convert the voltage level of the control pilot signal from the second level to a third level lower than the second level, when a switch for starting charging is turned on.

6. The isolation charging controller apparatus of claim 5, wherein the second state converter device includes:
a second isolator element configured to receive a turn-on signal from the second vehicle charging controller apparatus and to be turned on, when the switch for starting charging is turned on.

7. The isolation charging controller apparatus of claim 5, wherein the control pilot signal duty ratio sensor includes:
a first resistor element and a second resistor element connected in series between a power supply terminal and a ground terminal; and
a comparator, wherein the comparator is configured to:
receive the control pilot signal, the voltage level of which is converted by the second state converter device, and a voltage of a common node to obtain a comparison result of the first resistor element and the second resistor element;
compare the voltage level of the control pilot signal with the voltage of the common node; and
amplify the comparison result.

8. The isolation charging controller apparatus of claim 7, wherein a resistor value of each of the first resistor element and the second resistor element is configured such that a voltage level of the common node of the first resistor element and the second resistor element, which is applied to the comparator, becomes a value less than a minimum value of the voltage level of the control pilot signal.

9. The isolation charging controller apparatus of claim 2, wherein the control pilot signal level detector includes:
a buffer configured to receive the control pilot signal applied from the charging station system and to buffer the control pilot signal;
a peak detector configured to detect a peak current of the control pilot signal output from the buffer;
a voltage controlled oscillator configured to output a frequency signal in proportion to the peak current; and
an isolator element configured to transmit the frequency signal to the second vehicle charging controller apparatus in an isolated manner.

10. The isolation charging controller apparatus of claim 2, further comprising:
a proximity detection signal detector configured to detect a proximity detection signal capable of detecting whether a charging connector is plugged into a vehicle inlet.

11. The isolation charging controller apparatus of claim 10, wherein the proximity detection signal detector is configured to:
distinguishably detect a state where the charging connector is not plugged into the vehicle inlet, a case where the charging connector is plugged into the vehicle inlet but a switch for charging in the charging connector is turned off, or a case where the charging connector is plugged into the vehicle inlet and the switch for charging in the charging connector is turned on, using a proximity detection signal applied from the charging connector.

12. The isolation charging controller apparatus of claim 10, wherein the proximity detection signal detector includes:
a first comparator driven by receiving a first voltage by the proximity detection signal, and the second voltage obtained by dividing a power supply voltage and a ground voltage by a resistor element;
a first isolator element driven by an output of the first comparator and configured to transmit a signal to the second vehicle charging controller apparatus;
a second comparator driven by receiving the first voltage by the proximity detection signal, and the second voltage from dividing the power supply voltage and the ground voltage by the resistor element; and
a second isolator element driven by an output of the second comparator and configured to transmit a signal to the second vehicle charging controller apparatus.

13. The isolation charging controller apparatus of claim 12, wherein both the first isolator element and the second isolator element are turned off, when the charging connector is not plugged into the vehicle inlet,
wherein the first isolator element is turned on and the second isolator element is turned off when the charging connector is plugged into the vehicle inlet but a switch for charging in the charging connector is turned off, and
wherein both the first isolator element and the second isolator element are turned on when the charging connector is plugged into the vehicle inlet and the switch for charging in the charging connector is turned on.

14. The isolation charging controller apparatus of claim 1, wherein the second vehicle charging controller apparatus includes:
an isolation receiver including at least one or more isolator elements configured to receive a duty ratio of the control pilot signal, a frequency signal of the control pilot signal, and a proximity detection signal from an isolator element of the first vehicle charging controller apparatus in an isolated state.

15. The isolation charging controller apparatus of claim 14, wherein the second vehicle charging controller apparatus further includes:
an isolation converter configured to supply power to the first vehicle charging controller apparatus in an isolated state.

16. The isolation charging controller apparatus of claim 14, wherein the second vehicle charging controller apparatus further includes:
a charging starter device including an isolator element driven depending on an on/off state of a switch for starting charging and configured to transmit a charging start signal to the first vehicle charging controller apparatus.

17. A system comprising:
a charging connector to which a vehicle inlet is connected for charging;
a first vehicle charging controller apparatus configured to receive a control pilot signal for charging control from a charging station system and to receive power; and
a second vehicle charging controller apparatus isolated from the first vehicle charging controller apparatus and configured to perform vehicle charging control, using a signal received from the first vehicle charging controller apparatus.

18. The system of claim 17, wherein the charging connector includes:
a first resistor element and a switch connected in series between a power supply terminal and a ground terminal;
a second resistor element and a third resistor element connected in series between the first vehicle charging controller apparatus and the ground terminal; and a diode provided between a common node of the first resistor element and the switch and a common node of the second resistor element and the third resistor element.

19. The system of claim 17, wherein the first vehicle charging controller apparatus includes:
- a control pilot signal duty ratio sensor configured to convert a state of the control pilot signal and to sense a duty ratio of the control pilot signal;
- a control pilot signal level detector configured to detect a voltage level of the control pilot signal; and
- a proximity detection signal detector configured to detect a proximity detection signal capable of detecting whether the charging connector is plugged into the vehicle inlet.

20. The system of claim 17, wherein the second vehicle charging controller apparatus includes:
- a controller unit including at least one or more isolator elements configured to receive a duty ratio of the control pilot signal, a frequency signal of the control pilot signal, a proximity detection signal from an isolator element of the first vehicle charging controller apparatus in an isolated state; and
- an isolation converter configured to supply power to the first vehicle charging controller apparatus in an isolated state.

* * * * *